(12) United States Patent
Okajima et al.

(10) Patent No.: US 7,594,741 B2
(45) Date of Patent: Sep. 29, 2009

(54) BICYCLE LIGHTING DEVICE

(75) Inventors: Shinpei Okajima, Sakai (JP); Masashi Goto, Sakai (JP)

(73) Assignee: Shimano Inc., Osaka (JP)

( * ) Notice: Subject to any disclaimer, the term of this patent is extended or adjusted under 35 U.S.C. 154(b) by 275 days.

(21) Appl. No.: 11/395,972

(22) Filed: Apr. 3, 2006

(65) Prior Publication Data

US 2006/0285343 A1 Dec. 21, 2006

(30) Foreign Application Priority Data

Jun. 17, 2005 (JP) ............................. 2005-178440

(51) Int. Cl.
*B62J 6/00* (2006.01)
(52) U.S. Cl. .................. 362/473; 362/474; 362/475; 362/581; 362/191; 362/196
(58) Field of Classification Search ......... 362/473–476, 362/581, 191, 194, 196, 396
See application file for complete search history.

(56) References Cited

U.S. PATENT DOCUMENTS

| | | | | |
|---|---|---|---|---|
| 4,711,107 A | * | 12/1987 | Drane | 70/233 |
| 5,378,553 A | * | 1/1995 | Shoji | 429/97 |
| 5,584,561 A | * | 12/1996 | Lahos | 362/473 |
| 5,702,082 A | * | 12/1997 | Evans et al. | 248/230.1 |
| 5,933,076 A | * | 8/1999 | Babb | 340/475 |
| 6,062,910 A | * | 5/2000 | Braquet et al. | 439/620.03 |
| 6,428,192 B1 | * | 8/2002 | Chen | 362/474 |
| 6,568,838 B2 | * | 5/2003 | Taylor et al. | 362/474 |
| 6,837,599 B2 | * | 1/2005 | Liaw et al. | 362/473 |
| 6,953,260 B1 | * | 10/2005 | Allen | 362/194 |
| 2003/0189835 A1 | * | 10/2003 | Tsukamoto | 362/475 |

FOREIGN PATENT DOCUMENTS

| | | |
|---|---|---|
| CN | 2468875 Y | 1/2002 |
| JP | 08-276879 | 10/1996 |
| JP | 09-118281 | 5/1997 |
| JP | 2004-331016 | 11/2004 |

* cited by examiner

*Primary Examiner*—Gunyoung T. Lee
*Assistant Examiner*—Evan Dzierzynski
(74) *Attorney, Agent, or Firm*—Global IP Counselors, LLP (57) ABSTRACT

A bicycle lighting device configured to be mounted to a bicycle includes a lamp case, a control case and a mounting unit. The lamp case has a light emitting diode arranged therein. The control case is connected to the lamp case by a hinge. The control case is configured to clamp onto a handlebar. A control circuit for controlling the light emitting diode is installed inside the control case. The mounting unit is for attaching the lamp case and the control case to the handlebar in such a fashion that the lamp case and the control case are drawn close together.

23 Claims, 6 Drawing Sheets

Fig. 8

BICYCLE LIGHTING DEVICE

CROSS-REFERENCE TO RELATED APPLICATIONS

This application claims priority under 35 U.S.C. § 119 to Japanese Patent Application No. 2005-178440. The entire disclosure of Japanese Patent Application No. 2005-178440 is hereby incorporated herein by reference.

BACKGROUND OF THE INVENTION

1. Field of the Invention

This invention generally relates to a bicycle lighting device. More specifically, the present invention relates to a bicycle lighting device that is well suited for use as a headlamp for a bicycle.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. For example, bicycle lighting devices have been extensively redesigned over the years.

Front lighting devices used as front lamps for road bikes, mountain bikes and other sport bicycles are sometimes mounted to the handlebar of the bicycle. Brake levers and gear shift levers are also mounted to the handlebar, as are cycle computers (display devices configured to indicate such information as the riding speed, riding distance and heart rate) and other accessories. Consequently, the space available for mounting a lighting device to the handlebar of a bicycle, especially a sport bicycle, is sometimes limited. One known example of a lighting device configured to be mounted in a limited space is one that is mounted to a handlebar using an elastic band. (See, for example, Japanese Patent Publication No. 8-276879.) Such conventional lighting devices have a main body, an elastic band and an engaging part. The main body is provided with an arc-shaped recessed part that follows an external contour of the handlebar. The elastic band is fastened to the main body. The elastic band is provided with an engaging part on a tip end thereof. An engaging part is provided on the main body and is configured to engage with the engaging part of the elastic band. Such conventional lighting devices are fastened to the handlebar by first attaching the main body to the handlebar and engaging the engaging part of the elastic band with the engaging part of the main body such that the handlebar is pinched between the recessed part and the elastic band.

In the conventional arrangement described above, the lighting device is fastened by pinching the handlebar between the elastic band and the recessed part provided in the main body. As a result, a center of gravity of the main unit and a center of gravity of the handlebar are greatly separated from each other. Consequently, when a rotational moment is large or when the elastic band does not have a strong fastening force, there is a possibility that a fastened state will not be maintainable and the main body will rotate due to vibrations or the like. Conversely, if such a conventional lighting device is fastened securely by setting the elastic band such that it applies a strong force against the handlebar toward the recessed part, then the lighting device will be difficult to attach and detach to and from the handlebar.

In view of the above, it will be apparent to those skilled in the art from this disclosure that there exists a need for an improved bicycle lighting device. This invention addresses this need in the art as well as other needs, which will become apparent to those skilled in the art from this disclosure.

SUMMARY OF THE INVENTION

One object of the present invention is to provide a bicycle lighting device for mounting to a bicycle that is configured such that it does not readily rotate even when it is secured with a weak (small) fastening force. Another object of the present invention is to provide that a bicycle lighting device that is easily attached and detached.

The foregoing objects are basically attained by providing a bicycle lighting device in accordance with a first aspect that includes a lamp case, a control case and a mounting unit. The lamp case has a light source arranged therein. The control case is configured to be connected to the lamp case by a hinge and to clamp onto a portion of a bicycle. The control case has a control circuit for controlling the light source. The mounting unit is configured and arranged to draw the lamp case and control case toward each other.

When the lighting device is mounted to a portion of a bicycle such as the handlebar, the lamp case and the control case (which is connected to the lamp case by means of a hinge) contact the handlebar. The mounting unit is manipulated in such a manner that the lamp case and the control case are drawn toward each other so as to pinch the handlebar. Thus, the lamp case and the control case are arranged in such a fashion as to pinch the handlebar. As a result, a center of gravity of the lighting device is closer to a center of gravity of the handlebar and the rotational moment is smaller. Thus, since the lamp case and the control case are connected by a hinge and the bicycle lighting device is mounted to the bicycle in such a fashion that the lamp case and the control case pinch a portion of the bicycle, the rotational moment is smaller and the fastened state is maintained with a small fastening force. As a result, the lighting device is prevented from rotating readily even when a small fastening force is used. Thus, the lighting device is attached and detached with ease. Furthermore, by mounting the lighting device with a smaller fastening force that is sufficient to prevent the lighting device from rotating due to vibrations, a lighting angle is adjusted easily by applying a force larger than the fastening force with a user's hand.

The bicycle lighting device relating to a second aspect of the present invention is the bicycle lighting device according to the first aspect of the present invention wherein the light source includes at least one light emitting diode. With this bicycle lighting device, electric power consumption of the light source is reduced and the service life is lengthened by using the light emitting diode for the light source.

The bicycle lighting device relating to a third aspect of the present invention is the bicycle lighting device according to the second aspect of the present invention wherein the light source includes two light emitting diodes arranged so as to be positioned one over the other when the bicycle lighting device is mounted to the bicycle. With this bicycle lighting device, an outward protrusion is suppressed and the lighting device is prevented from interfering with other accessories. Additionally, since optical axes of the light sources are arranged vertically (one over the other), gear shift cables arranged near the handlebar are prevented from interfering with the light beams.

The bicycle lighting device relating to a fourth aspect of the present invention is the bicycle lighting device according to anyone of the first through third aspects of the present invention wherein the lamp case is configured such that it lights in front of the bicycle when mounted to a handlebar of the bicycle and the control case has an on-off switch provided in a position corresponding to the side of the control case that faces rearward when the bicycle lighting device is mounted to the bicycle. With this bicycle lighting device, a rider operates the on-off switch while gripping the handlebar without adopting an uncomfortable posture because the on-off switch is arranged close to the rider.

The bicycle lighting device relating to a fifth aspect of the present invention is the bicycle lighting device according to anyone of the first through fourth aspects of the present invention wherein the lamp case and/or the control case has a recessed mating surface for mating with a handlebar of the bicycle. With this bicycle lighting device, since the lamp case and/or the control case has a recessed mating surface configured to mate with a handlebar of the bicycle, which is generally made of a pipe-like member, the lamp case and/or control case readily establishes good contact with the handlebar and a stable mounting state is achieved.

The bicycle lighting device relating to a sixth aspect of the present invention is the bicycle lighting device according to anyone of the first through fifth aspects of the present invention wherein the control case has an electric power input part for receiving electric power from an alternating-current electric generator installed on the bicycle. With this bicycle lighting device, the troublesome task of changing a battery or batteries is avoided because the bicycle lighting device illuminates using electric power from an alternating-current electric generator.

The bicycle lighting device relating to a seventh aspect of the present invention is the bicycle lighting device according to the sixth aspect of the present invention wherein the electric power input part has an electric power supply cable that protrudes to the outside from the control case and is configured such that it is connected to the alternating-current electric generator. With this bicycle lighting device, the bicycle lighting device is operated by merely connecting the electric power supply cable to the alternating-current electric generator.

The bicycle lighting device relating to an eighth aspect of the present invention is the bicycle lighting device according to the seventh aspect of the present invention wherein the electric power supply cable includes a shielded coaxial cable. With this bicycle lighting device, cycle computers, heart rate computers and other accessories utilizing computers is able to be mounted near the lighting device without experiencing electromagnetic interference.

The bicycle lighting device relating to a ninth aspect of the present invention is the bicycle lighting device according to anyone of the sixth through eighth aspects of the present invention wherein the control circuit has a rectifier circuit configured to convert the electric power from the alternating-current electric generator into direct current. With this bicycle lighting device, since the alternating current outputted from the alternating-current electric generator is rectified into direct current, a light emitting diode or other light source that operates using direct current is used instead of a typical light bulb.

The bicycle lighting device relating to a tenth aspect of the present invention is the bicycle lighting device according to the ninth aspect of the present invention wherein the control circuit has an electric energy storage element configured to store direct-current electric power outputted from the rectifier circuit. With this bicycle lighting device, the light source continues emitting light even when the bicycle stops moving and the alternating-current electric generator stops generating electricity.

The bicycle lighting device relating to an eleventh aspect of the present invention is the bicycle lighting device according to anyone of the firs through fifth aspects of the present invention wherein the control case has a battery configured to house one or more batteries to serve as a power source for the control circuit and the light source.

The bicycle lighting device relating to a twelfth aspect of the present invention is the bicycle lighting device according to anyone of the first through eleventh aspects of the present invention wherein the mounting unit includes engaging parts provided on the lamp case and the control case; and a force applying member configured to engage with the engaging parts and to apply a force in such a direction as to cause the lamp case and the control case to draw closer together. With this bicycle lighting device, the bicycle lighting device does not readily move even if vibrations occur during riding because the force applying member applies a force in such a direction that the lamp case and control case are drawn closer together. The mounting unit contacts the portion of the bicycle by utilizing a force applying member that is made of rubber or other elastic material. The portion of the bicycle is pinched between three different members, i.e., the lamp case, the control case, and the mounting unit, thereby enabling a stable mounting state to be achieved.

Since the lamp case and the control case of the present invention are connected by means of a hinge and since the bicycle lighting device is mounted to the bicycle such that the lamp case and the control case pinch a portion of the bicycle, the rotational moment is smaller and the fastened state is maintained with a small fastening force. As a result, the lighting device is prevented from rotating readily even when a small fastening force is used. Thus, the lighting device is attached and detached with ease. Furthermore, since the lighting device is mounted with a small fastening force that is less likely to rotate due to vibrations, the lighting angle is adjusted easily by applying a force larger than the fastening force with one's hand.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
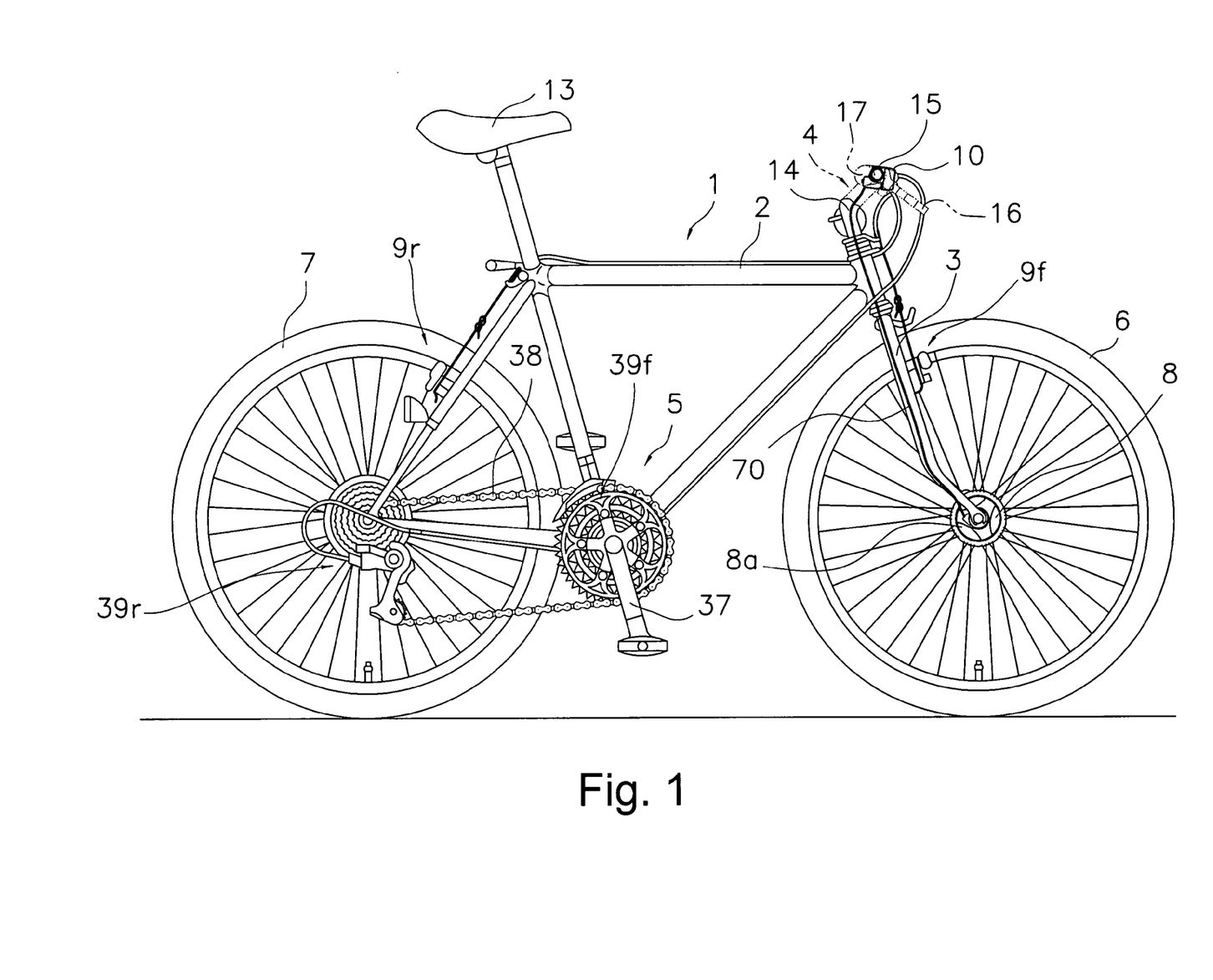
FIG. 1 is a side elevational view of a bicycle equipped with a bicycle lighting device in accordance with a first embodiment of the present invention.

Referring initially to FIG. 1, a bicycle is illustrated in which an embodiment of the present invention is employed. The bicycle is a mountain bike capable of being ridden on uneven terrain. The bicycle includes a frame 1, a handlebar unit 4, a drive unit 5, a front wheel 6, a rear wheel 7, a pair (front and rear) of brake devices 9f and 9r and a head lamp 10. The front wheel 6 has a hub generator unit 8 mounted thereto. The headlamp 10 is mounted to the handlebar unit 4. The headlamp or bicycle lighting device 10 is for lighting in front of the bicycle. Other examples of bicycle lighting devices 10 include a tail lamp or a position lamp. The position lamp is configured to indicate the position of the bicycle by flashing or the like. A cycle computer (not shown) configured to display such riding information as the current speed and the traveling distance is mounted in a freely detachable manner next to the headlamp 10.

The frame 1 has a diamond-shaped frame body 2 and a front fork 3. The frame body 2 is made by welding pipes together. A saddle 13, a drive unit 5 and other parts are mounted to the frame body 2. The front fork 3 is mounted to a front portion of the frame body 2 such that the front fork 3 pivots freely about a slanted rotational axis.

The handlebar unit 4 has a handlebar stem 14 and a handlebar 15. The handlebar stem 14 is fastened to an upper portion of the front fork 3. The handlebar 15 is fastened to the handlebar stem 14. A grip 17 and a brake lever 16 for operating the front and rear brake device 9f and 9r are mounted to each of two ends of the handlebar 15.

The drive unit 5 includes a crank set 37, a chain 38 and front and rear externally mounted gear changing devices 39f and 39r. The crank set 37 is provided on a lower portion (bottom bracket) of the frame body 2. The chain 38 is engaged with the crank set 37. A gear shift lever (not shown) for shifting one or the other of the front and rear externally mounted gear changing devices 39f and 39r is provided on each of the left and right brake levers 16 as either a separate unit or an integral one-piece unit.

The front wheel 6 is fastened to a tip end of the front fork 3. An alternating-current electric generator 19 configured to generate electricity by utilizing the rotation of the front wheel 6 is arranged inside the hub generator unit 8. The headlamp 10 operates using electric power from the alternating-current electric generator 19. It will be apparent to one of skill in the art from this disclosure that it is acceptable to provide a battery case for installing a battery or batteries inside the control case and drive the headlamp 10 using electric power from the battery or batteries installed in the battery case.

As shown in FIGS. 2-5, the headlamp 10 is configured to be attached and detached to and from the handlebar 15. The headlamp 10 is particularly well suited for racing bicycles. The headlamp 10 includes a lamp case 41, a control case 43 and a mounting unit 44. The lamp case 41 preferably has two light emitting diodes 40 installed within the lamp case 41 to serve as light sources. The control case 43 is connected to the lamp case 41 by means of a hinge 42. The mounting unit 44 is configured to draw the lamp case 41 and the control case 43 toward each other.

Figure 2:
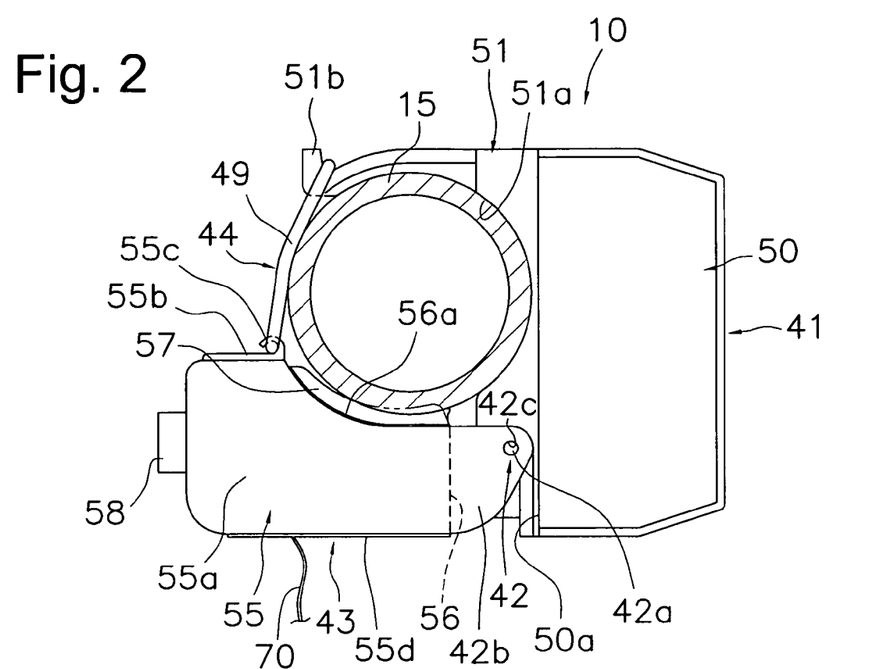
FIG. 2 is a partial cross-sectional view of the bicycle lighting device on a handlebar of the bicycle illustrated in FIG. 1 in accordance with the first embodiment of the present invention.

The two light emitting diodes 40 are of a high brightness type, e.g., a 3-W, 700-mA type. The two light emitting diodes 40 are arranged such that they are positioned above and below each other (vertically aligned) when the headlamp 10 is mounted to the handlebar 15. It will be apparent to one of ordinary skill in the art from this disclosure that the present invention is not limited to the use of a light emitting diode 40 as a light source and that it is acceptable to use a light bulb or a fluorescent lamp. When a light bulb or fluorescent lamp is used as the light source, the light is shone rearward as well as forward, unlike a light emitting diode 40, which only shines in a forward direction. Therefore, when a light bulb or fluorescent lamp is used, it is preferable to reflect the rearwardly emitted light forward by adding a reflective mirror to the cooling unit or providing a reflection unit not having a cooling function.

The lamp case 41 has a rectangular lens member 50 with an open bottom part 50a and a lamp frame 51. The lens member 50 is mounted on a front of the lamp case 41. The lamp frame 51 is mounted such that a perimeter thereof mates closely with the bottom part 50a of the lens member 50.

The lens member 50 is made of a transparent synthetic resin. The lens member 50 is configured to collect only light that is shown forward from the light emitting diodes 40. A cooling unit 45 made of, for example, aluminum is arranged inside the lens member 50. The cooling unit 45 has a heat sink 45a that is arranged so as to surround the light emitting diodes 40. The heat sink 45a dissipates heat emitted from the light emitting diodes 40. The cooling unit 45 is configured such that a portion thereof protrudes between the lens member 50 and the lamp frame 51. The cooling unit 45 is screw-fastened to the lamp frame 51 together with the lens member 50. Accordingly, the light emitting diodes 40 are arranged at a front side of the lamp frame 51. As a result, the cooling unit 45 is air-cooled when the bicycle moves.

Figure 4:
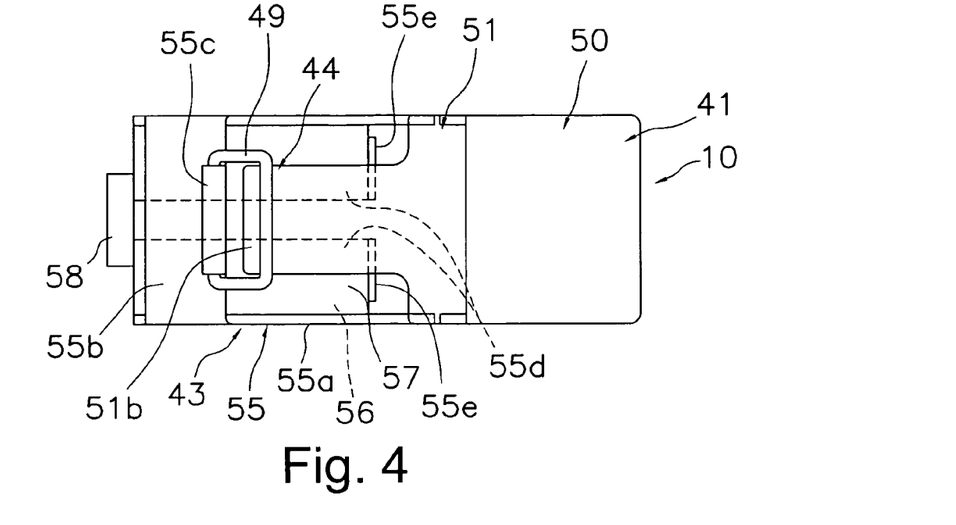
FIG. 4 is a top view of the partial cross-sectional view of the bicycle lighting device illustrated in FIGS. 2 and 3 in accordance with the first embodiment of the present invention.
Figure 5:
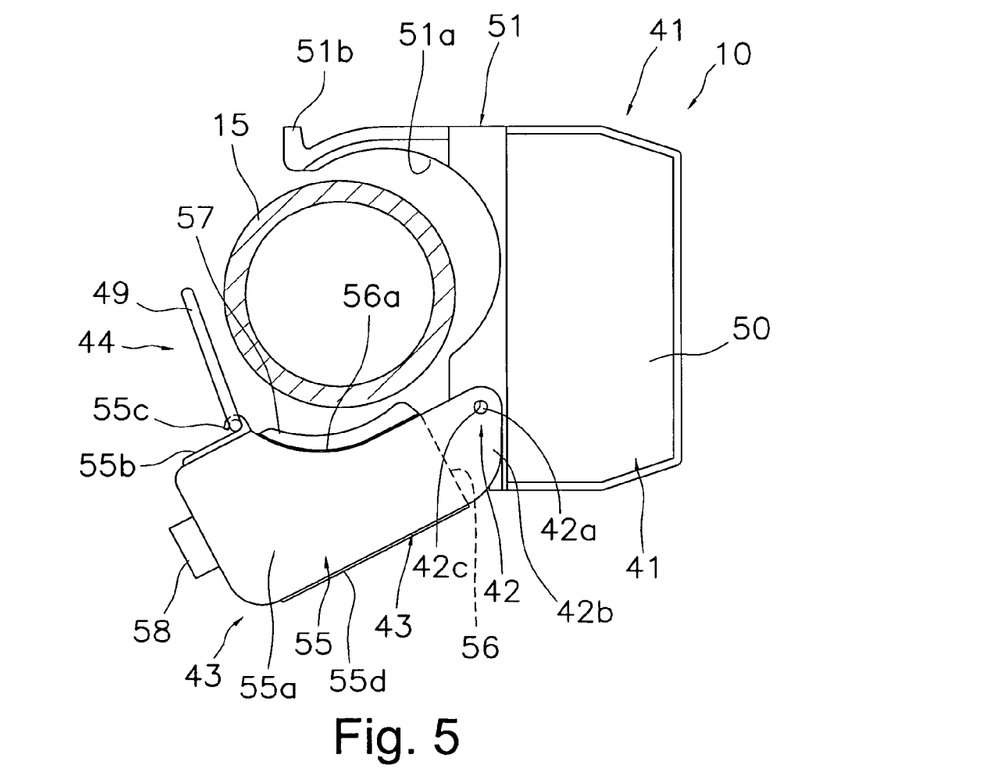
FIG. 5 is a side view showing the bicycle lighting device with a mounting unit detached from a lamp case in accordance with the first embodiment of the present invention.

Referring to FIGS. 2 and 5, the lamp frame 51 is made of synthetic resin. The lamp frame 51 has a large, generally semicircular, arc-shaped first recessed mating surface 51a provided on a back side thereof. Referring to FIG. 4, a center section of an upper part of the back side of the lamp frame 51 where the first recessed mating surface 51a is formed extends rearward in a T-like shape. The lamp frame further has an upwardly curved first engaging part 51b that is provided on a tip end of the center section and forms part of the mounting unit 44. An annular member or force applying member 49 made of an elastic material, e.g., an O-ring, engages with the first engaging part 51b. The first engaging part 51b and the annular member 49 are part of the mounting unit 44. It will be apparent to one of ordinary skill in the art from this disclosure that the force applying member 49 of the mounting unit 44 can be a latch, spring member or other mechanism such as is used for opening and closing a suitcase or briefcase.

The hinge 42 has a hinge shaft 42a that protrudes from both sides of the headlamp 10. The hinge shaft 42a is provided on a lower part of the portion of the lamp frame 51 where the first recessed mating surface 51a is formed.

Referring to FIGS. 2, 4 and 5, the control case 43 is arranged in a substantially perpendicular orientation with respect to the lamp case 41 when the headlamp 10 is mounted to the handlebar 15. The control case 43 includes an outer frame 55, an inner case 56 and an elastic member 57. The outer frame 55 is attached to the lamp frame 51 in a freely pivotal manner by the hinge 42. The elastic member 57 is fixed to an upper surface of the inner case 56.

The outer frame 55 is made of a sheet-like material and is configured to cover both sides, the top, and both sides of a bottom of the inner case 56. The inner case 56 is configured to be mounted inside the outer frame 55. The inner case 56 has a control circuit 60 (see FIG. 6) mounted therein. The hinge 42 further includes a plurality of protruding parts 42b. The protruding parts 42b extend toward side faces of the lamp frame 51. The protruding parts 42b help form the hinge 42. The protruding parts 42b have a plurality of hinge holes 42c configured to engage with the hinge shaft 42a. The outer frame 55 includes a plurality of side panels 55a, an upper panel 55b, a second engaging part 55c, a pair of bottom panels 55d and an upwardly extending positioning part 55e. The protruding parts 42b are provided on front ends of the two side panels 55a that cover both sides of the inner case 56. The upper panel 55b covers the top of the inner case 56. The upper panel 55b is configured to connect the two side panels 55a at a rearward portion of the outer frame 55. The second engaging part 55c forms part of the mounting unit 44. The second engaging part 55c is formed on the upper panel 55b. The second engaging part 55c is curved reward in a circular arc-like shape. The second engaging part 55c is configured to hold the annular member 49 more securely than the first engaging part 51b, i.e., such that the annular member 49 does not easily become disengaged. Therefore, the annular member 49 is normally attached and detached at the first engaging part 51b. The bottom panels 55d serve to cover both sides of the bottom part of the inner case 56. The bottom panels 55d are configured to extend from the bottoms of the side panels 55a toward the middle so as to reach intermediate positions on both sides of the middle. The upwardly extending positioning part 55e is formed on a front portion of each bottom panel 55d.

The inner case 56 is a generally rectangular box-shaped member having a second recessed mating surface 56a provided on a forward portion of the upper surface of the inner case 56 and an internal space for housing the control circuit 60. The second recessed mating surface 56a is curved in substantially the shape of a quarter circle. The elastic member 57 is fixed to the second recessed mating surface 56a. The elastic member 57 is made of, for example, a synthetic rubber material and configured to give slightly when it contacts the handlebar 15. The elastic member 57 serves to make rotation of the headlamp 10 with respect to the handlebar 15 more difficult.

A switch 58 for turning the light emitting diodes 40 on and off is arranged on a rear face of the inner case 56. Instead of using a switch 58 to turn the headlamp on and off, it will be apparent to one of ordinary skill in the art from this disclosure that it is also acceptable to provide a luminance sensor inside the control circuit to detect the ambient luminance and control the on-off state of the headlamp based on the detection result of the luminance sensor.

An electric power supply cable or electric power input part 70 extends from the bottom face of the inner case 56. The electric power supply cable 70 is capable of being connected to a connector 8a provided on one end of the hub generator unit 8. The electric power supply cable 70 is a shielded cable for limiting noise emissions or the like, which might adversely affect other accessories. It will be apparent to one of ordinary skill in the art from this disclosure that the electric power supply cable 70 is not limited to a shielded cable and that it is acceptable to use a regular non-shielded cable. Furthermore, the electric power supply cable 70 is not limited to a cable. It will be apparent to one of ordinary skill in the art from this disclosure that it is acceptable to use a connector that is capable of being electrically connected to a cable. When a connector is used, it is preferable to provide a cover that protects the connector from moisture.

Referring to FIG. 2, the mounting unit 44 includes the annular member 49 and the first and second engaging parts 51b and 55c. The annular member 49 engages with the first engaging part 51b and the second engaging part 55c. The annular member 49 functions to apply forces against the lamp case 41 and the control case 43 in such directions as to cause the lamp case 41 and the control case 43 to draw closer to each other and pinch the handlebar 15. The annular member 49 also contacts the handlebar 15 and serves to prevent slippage.

Figure 6:
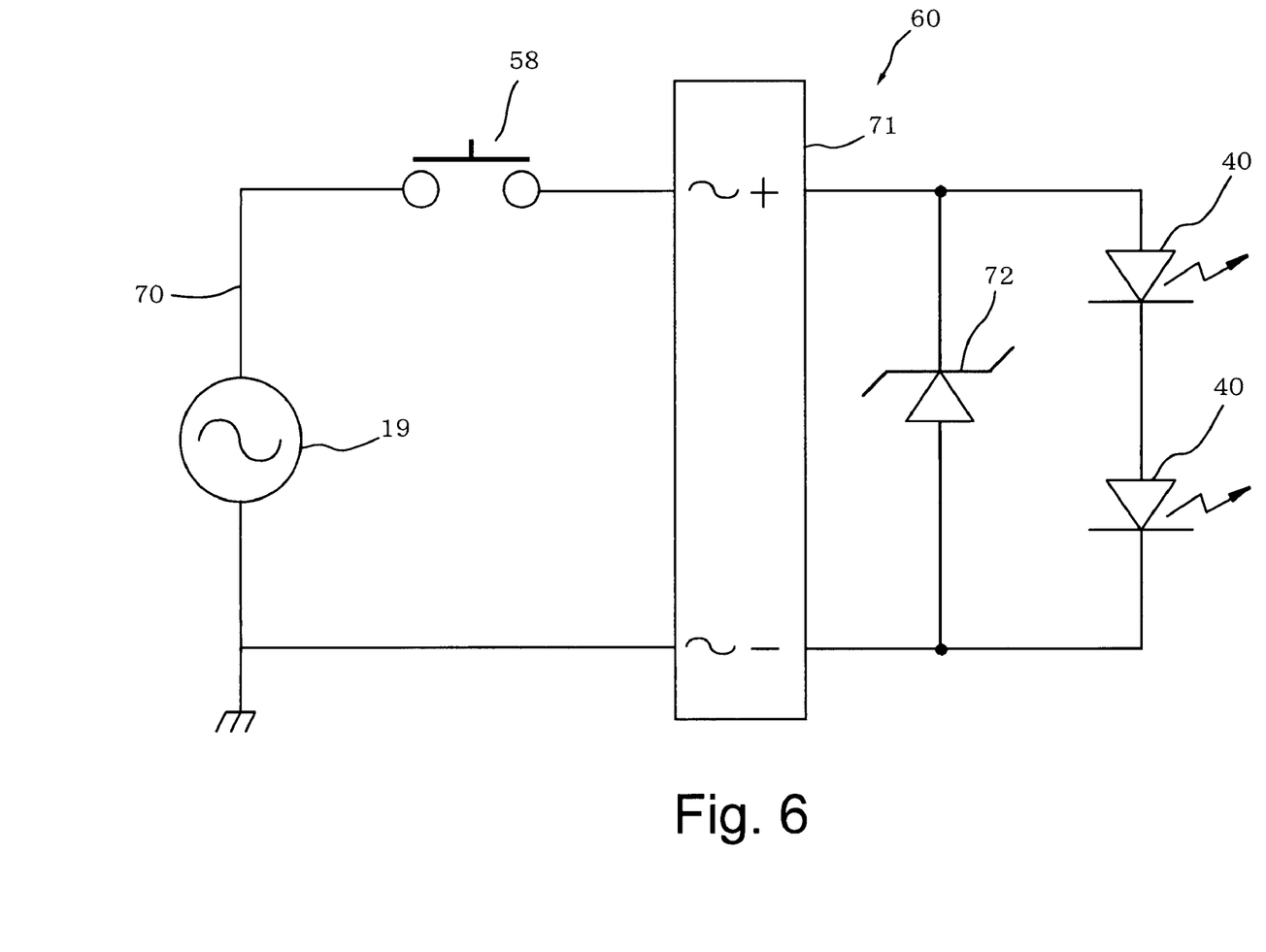
FIG. 6 is a block diagram of a control circuit of the bicycle lighting device illustrated in FIGS. 1-5 in accordance with the first embodiment of the present invention.

As shown in FIG. 6, the control circuit 60 includes the switch 58, a full-wave rectifier circuit 71 and a zener diode 72. The switch 58 is electrically connected to one end of the alternating-current electric generator 19 inside the hub generator unit 8. The full-wave rectifier circuit 71 is connected in parallel with the alternating-current electric generator 19. The full-wave rectifier circuit 71 serves to rectify the full cycle of the alternating current and convert it into direct current. The zener diode 72 is connected in parallel with the full-wave rectifier circuit 71. The zener diode 72 is configured to conduct when the generated voltage becomes high and functions as a protection circuit. The two light emitting diodes 40 are connected together in series. The two light emitting diodes 40 are connected in parallel with the zener diode 72.

The internal resistance of the alternating-current electric generator 19 is high and the resistance of the light emitting diodes 40 is low. By connecting the alternating-current electric generator 19 with the light emitting diodes 40, a high voltage dividing ratio is obtained. Thus, the sum total of the electric power consumed by the two light emitting diodes 40 is not larger than the electric power consumption of a lamp employing only a single light emitting diode. Furthermore, the brightness is higher and less torque is required to rotate the alternating-current electric generator 19.

Figure 7:
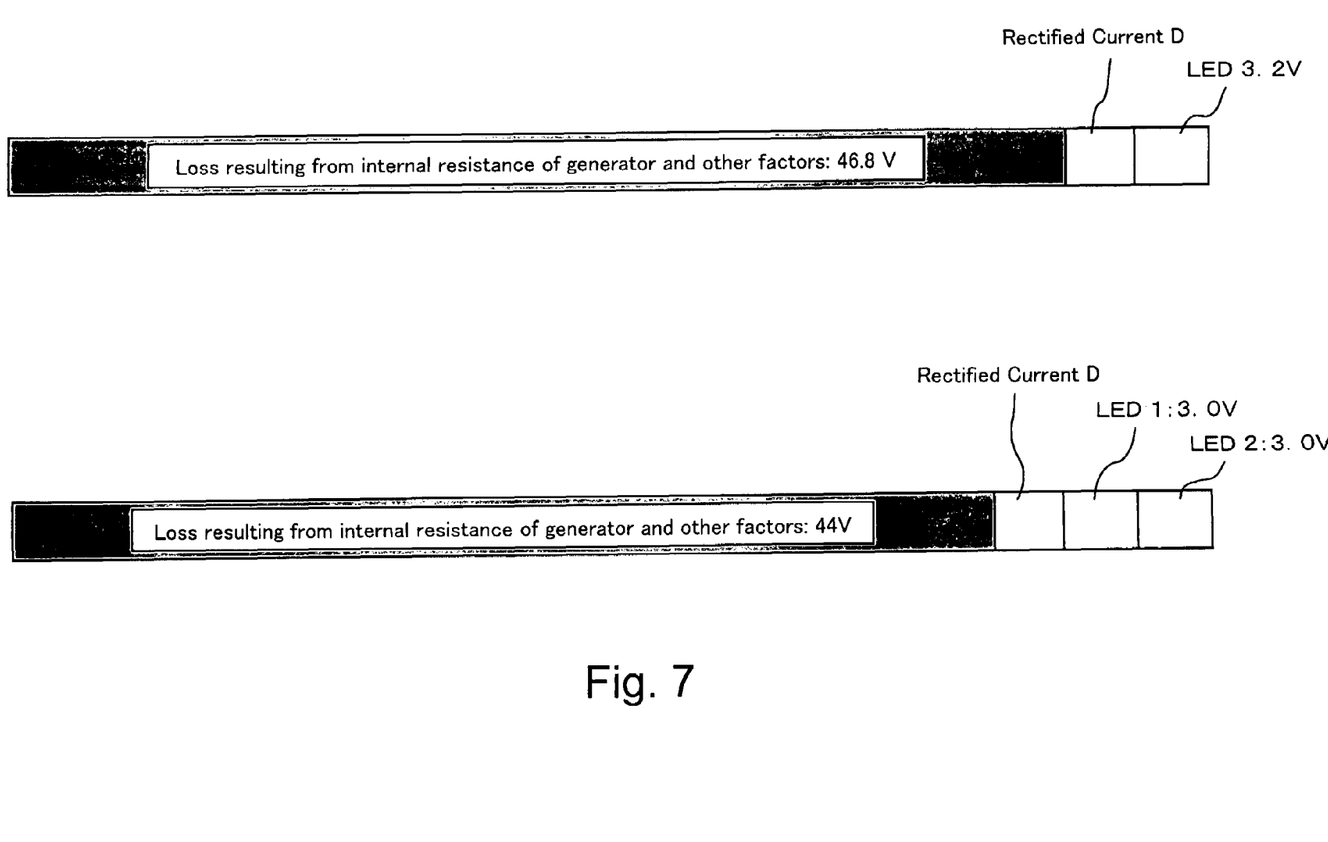
FIG. 7 is a diagram illustrating the effects of the internal losses that occur when the bicycle lighting device is illuminated in accordance with the first embodiment of the present invention.

Referring to FIG. 7, according to experiments conducted when the bicycle travels at a speed of 50 km/h, the loss due to the internal resistance of the electric generator 19 is 44 V and the voltage drop across each light emitting diode 40 is 3.0 V. The overall current is 0.41 A.

Thus, the power consumption P is given by $P = VI = (44.0 \times 0.41 + (3.0 \times 0.41) \times 2) = 20.5$ W.

With only one light emitting diode 40, according to experiments conducted when the bicycle travels at a speed of 50 km/h, the alternating-current electric generator 19 generates a voltage of 50 V and the loss due to the internal resistance of the electric generator 19 is 46.8 V. The voltage drop across the light emitting diode 40 is 3.2 V, and the overall current is 0.42 A when there is only one light emitting diode 40.

Thus, the power consumption P is given by $P = VI = (46.8 \times 0.42 + 3.2 \times 0.42) = 21.0$ W.

In this way, the experiment verifies that a higher brightness is obtained with almost no change in the total power consumption when two light emitting diodes 40 are used.

When the headlamp 10 is mounted to the handlebar 15, it is placed on the handlebar 15 with the mounting unit 44 detached from the first engaging part 51b, as shown in FIG. 5. Then, the mounting unit 44 is engaged with (hooked onto) the first engaging part 51b such that the handlebar 15 is pinched between the lamp case 41 and the control case 43. As a result, the mounting unit 44 applies a force in such a direction that the lamp case 41 and the control case 43 draw toward each other and press against the handlebar 15. This pinching action fastens the headlamp 10 to the handlebar 15. After the headlamp 10 is fastened to the handlebar 15, the installation is completed by connecting the electric power supply cable 70 to the connector 8a. After the headlamp 10 is mounted to the handlebar 15, a center of gravity of the headlamp 10 is positioned between the lamp case 41 and the control case 43. Thus, the center of gravity is positioned close to a center of the handlebar 15. As a result, a rotational moment is small and the headlamp 10 does not readily rotate due to vibrations even when the headlamp 10 is secured with a small fastening force. More particularly, since the control case 43 has a larger mass than the lamp case 41 and since the control case 43 is arranged below the handlebar 15, the center of gravity of the headlamp 10 is positioned lower than the center of the handlebar 15. Thus, the rotational moment due to gravity is even smaller.

Once installed, the headlamp 10 operates using electric power obtained from the alternating-current electric generator 19 when the bicycle is ridden. The electric power from the alternating-current electric generator 19 is fed to the full-wave rectifier circuit 71 through the electric power supply cable 70 and the switch 58 for conversion into direct current. The direct current is then supplied to the two light emitting diodes 40 connected in series. The total electric power consumption is not larger than a circuit in which only one light emitting diode is used.

Figure 3:
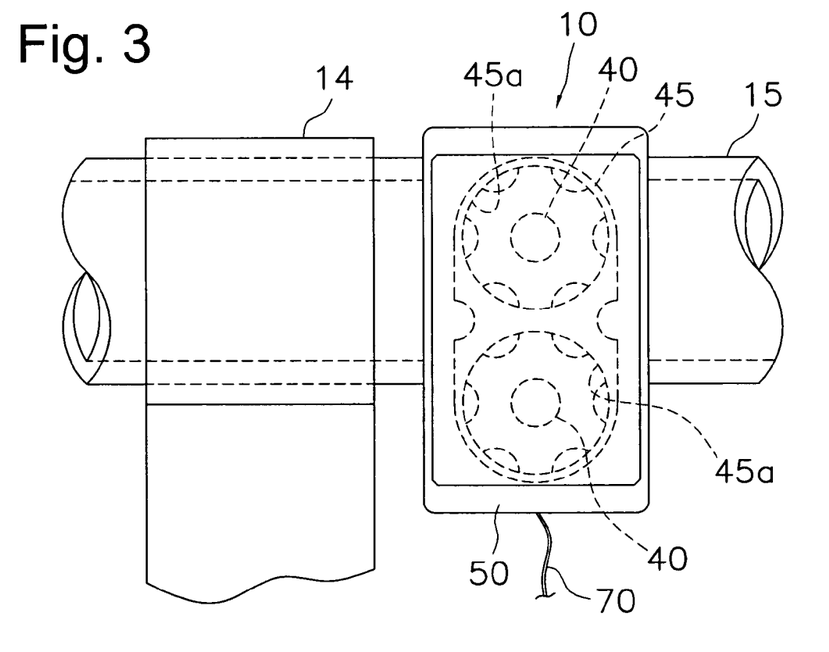
FIG. 3 is a side view of the partial cross-sectional view of the bicycle lighting device illustrated in FIG. 2 in accordance with the first embodiment of the present invention.

Thus, since the lamp case 41 and the control case 43 are connected by a hinge 42 and since the headlamp 10 is mounted to the bicycle in such a fashion that the lamp case 41 and the control case 43 pinch the handlebar 15, the rotational moment is smaller and a fastened state is maintained with a smaller fastening force. As a result, the headlamp 10 is prevented from rotating readily even when a small fastening force is used and the headlamp 10 is attached and detached with ease. Furthermore, as can be seen in FIG. 3, the light emitting diodes 40 (light sources) are non-adjustably fixed in position within the lens member 50 of the lamp case 41. Hence, by mounting the headlamp 10 with a smaller fastening force (the clamping force) that is sufficient to prevent the headlamp 10 from rotating due to vibrations, the lighting angle of the headlamp 10 is adjusted easily by manually applying a force larger than the fastening force with one's hand.

Also, since the headlamp 10 is mounted to the bicycle by pinching the handlebar 15 with the lamp case 41 and the control case 43, the headlamp 10 is reliably fastened to the handlebar 15 even if an external diameter of the handlebar 15 does not match a radius of the first and second recessed mating surfaces 5*a* and 56*a*.

Second Embodiment

Figure 8:
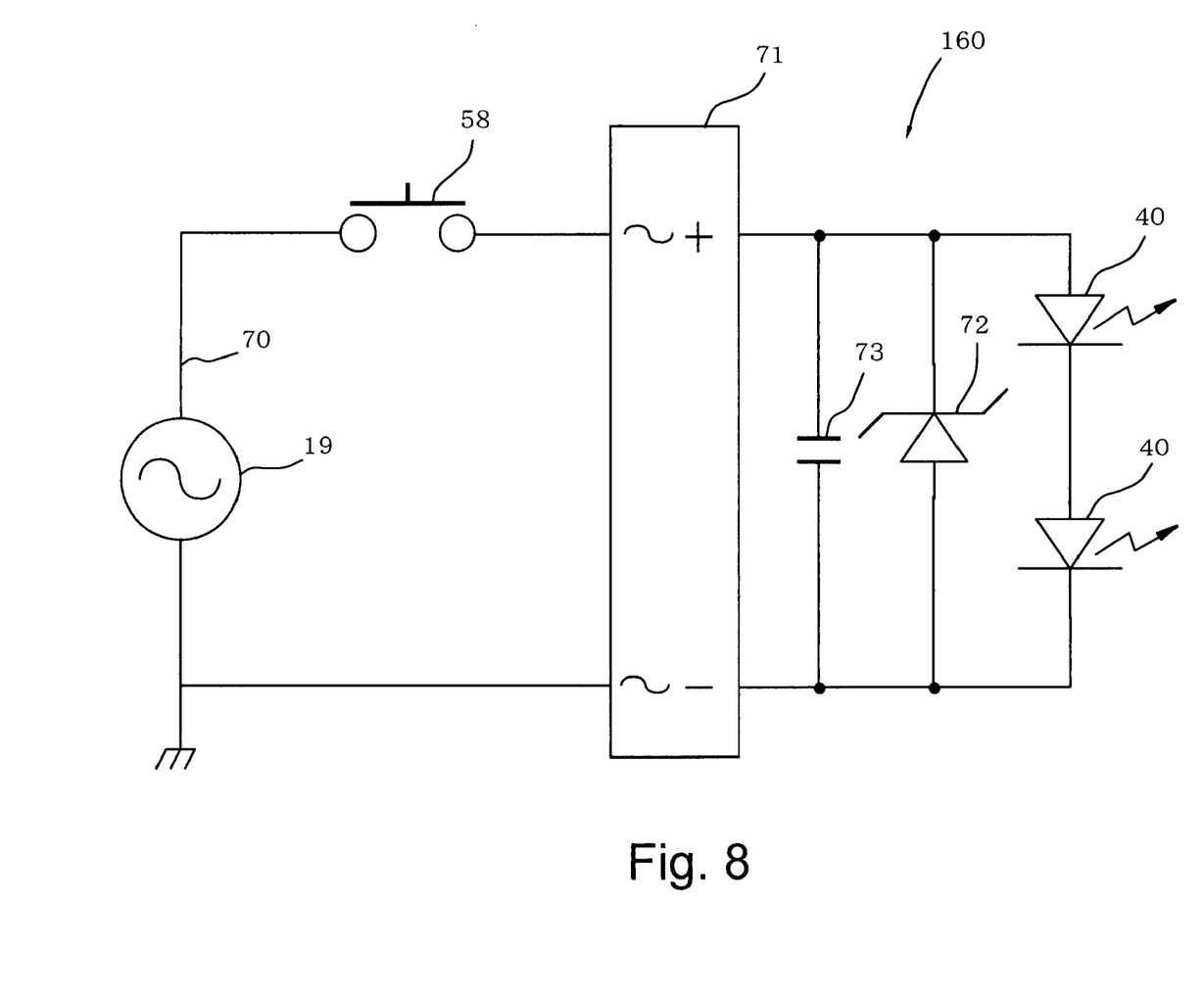
FIG. 8 is a block diagram of a control circuit of a bicycle lighting device in accordance with the first embodiment of the present invention.

Referring now to FIG. 8, a control circuit 160 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The control circuit 160 is basically the same as the control circuit 60 of the first embodiment except that, an electric energy storage element 73 is provided in the control circuit 160. The electric energy storage element 73 is connected in parallel with the full-wave rectifier circuit 71 within the control circuit 160. The electric energy storage element 73 is preferably a secondary battery, such as a rechargeable lithium ion battery, or a large capacity capacitor, such as an electric double layer capacitor. Use of the electric energy storage element 73 allows the headlamp 10 to provide light even when the alternating-current electric generator 19 is not generating electricity, such as when the bicycle is not moving.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle lighting device comprising:
   a lamp case having a light source non-adjustably fixed in position therein, the lamp case having a first mating surface;
   a control case having a second mating surface, the control case being pivotally connected to the lamp case by a hinge such that the first and second mating surfaces clamp onto a portion of a bicycle, the control case having a control circuit for controlling the light source; and
   a mounting unit including a non-metallic elastically deformable flexible member mounted to one of the lamp case and the control case, the flexible member being removably attachable to the other of the lamp case and the control case such that with the flexible member attached to the other of the lamp case and the control case the flexible member draws the lamp case and the control case toward each other providing a clamping force urging the first and second mating surfaces to clamp to the portion of the bicycle.

2. The bicycle lighting device as recited in claim 1, wherein the light source includes at least one light emitting diode.

3. The bicycle lighting device as recited in claim 2, wherein the light source includes two light emitting diodes that are positioned one over another.

4. The bicycle lighting device as recited in claim 2, wherein the mounting unit includes an engaging part provided on one of the lamp case and the control case, and a force applying member provided on the other of the lamp case and the control case configured to engage with the engaging part and configured to apply the clamping force in a direction so as to cause the lamp case and the control case to draw closer together.

5. The bicycle lighting device as recited in claim 1, wherein the portion of the bicycle includes a handlebar and the lamp case is configured such that the lamp case shines light in front of the bicycle.

6. The bicycle lighting device as recited in claim 5, wherein the first mating surface has an arcuate shape for mating with a handlebar of the bicycle.

7. The bicycle lighting device as recited in claim 1, wherein the control case has an on-off switch positioned at a side of the control case that faces rearwardly relative to the bicycle.

8. The bicycle lighting device as recited in claim 7, wherein the second mating surface has an arcuate shape for mating with a handlebar of the bicycle.

9. The bicycle lighting device as recited in claim 8, wherein
the control case has a battery case configured to house at least one battery to serve as a power source for the control circuit and the light source.

10. The bicycle lighting device as recited in claim 7, wherein
the control case has a battery case configured to house at least one battery to serve as a power source for the control circuit and the light source.

11. The bicycle lighting device as recited in claim 1, wherein the first mating surface on lamp case has an arcuate shape for mating with a handlebar of the bicycle and the second mating surface on the control case has an arcuate shape for mating with a handlebar of the bicycle.

12. The bicycle lighting device as recited in claim 1, wherein
the control case has an electric power input part configured for receiving electric power from an alternating-current electric generator on the bicycle.

13. The bicycle lighting device as recited in claim 12, wherein
the electric power input part has an electric power supply cable that protrudes from the control case to an outside and is configured such that the electric power supply cable is connected to the alternating-current electric generator.

14. The bicycle lighting device as recited in claim 13, wherein
the electric power supply cable includes a shielded coaxial cable.

15. The bicycle lighting device as recited in claim 14, wherein
the control circuit has a rectifier circuit configured to convert the electric power from the alternating-current electric generator into direct current.

16. The bicycle lighting device as recited in claim 13, wherein
the control circuit has a rectifier circuit configured to convert the electric power from the alternating-current electric generator into direct current.

17. The bicycle lighting device as recited in claim 12, wherein
the control circuit has a rectifier circuit configured to convert the electric power from the alternating-current electric generator into direct current.

18. The bicycle lighting device as recited in claim 17, wherein
the control circuit has an electric energy storage element configured to store direct-current electric power from the rectifier circuit.

19. The bicycle lighting device as recited in claim 1, wherein
the control case has a battery case configured to house at least one battery to serve as a power source for the control circuit and the light source.

20. The bicycle lighting device as recited in claim 1, wherein the mounting unit includes an engaging part provided on one of the lamp case and the control case, and a force applying member provided on the other of the lamp case and the control case configured to engage with the engaging part and configured to apply the clamping force in a direction so as to cause the lamp case and the control case to draw closer together.

21. The bicycle lighting device as recited in claim 1, wherein the mounting unit including an elastic member positioned on the second mating surface of the control case such that with the control case and lamp case clamped about the portion of the bicycle, the elastic member engages the portion of the bicycle.

22. The bicycle lighting device as recited in claim 1, wherein
the flexible member is an O-ring.

23. The bicycle lighting device as recited in claim 1, wherein
the mounting unit is configured and arranged such that the clamping force is sufficient to prevent the lamp case and the control case from rotating relative to the portion of the bicycle, but a lighting angle of the lamp case is adjusted easily by manually applying a force larger than the clamping force in order to move the lamp case and the control case relative to the portion of the bicycle.

* * * * *